May 3, 1966 J. A. NUCKOLLS 3,249,807
CONTROL CIRCUIT USING PARALLEL CONTROL RECTIFIERS
Filed Sept. 13, 1962 2 Sheets-Sheet 1
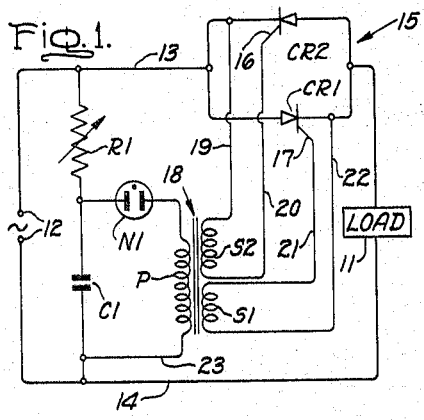
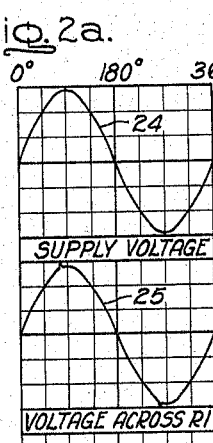
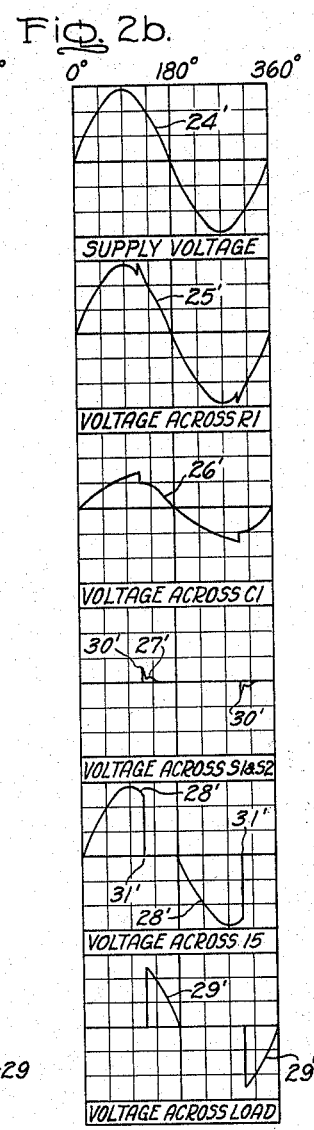
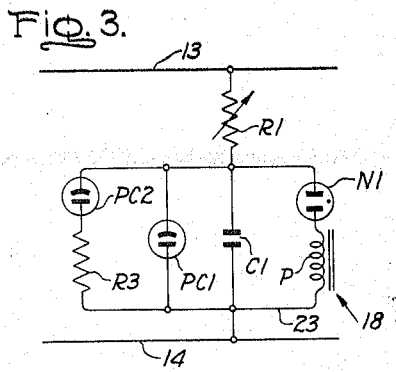
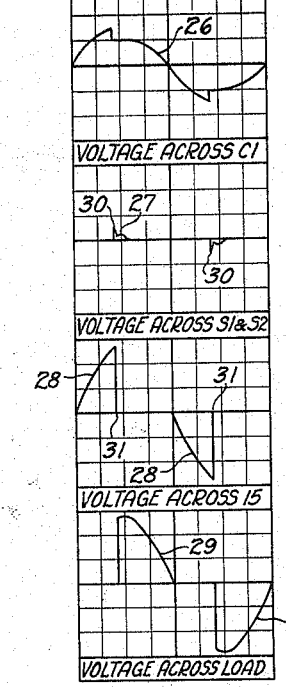
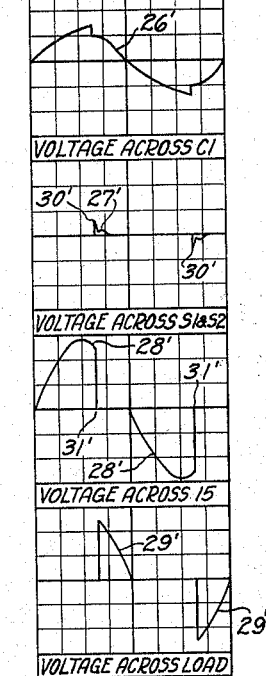
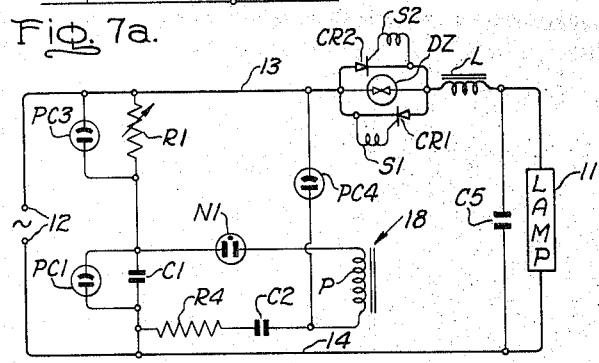
Inventor:
Joe A. Nuckolls
by Henry T. Olsen
His Attorney May 3, 1966  J. A. NUCKOLLS  3,249,807
CONTROL CIRCUIT USING PARALLEL CONTROL RECTIFIERS
Filed Sept. 13, 1962  2 Sheets-Sheet 2
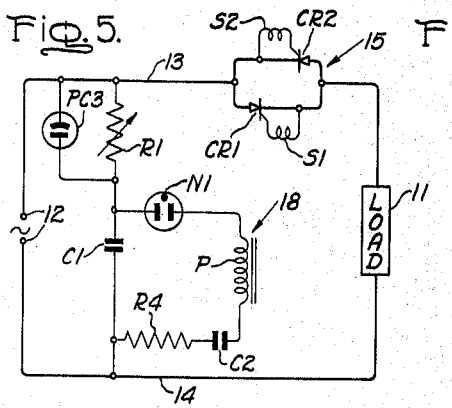
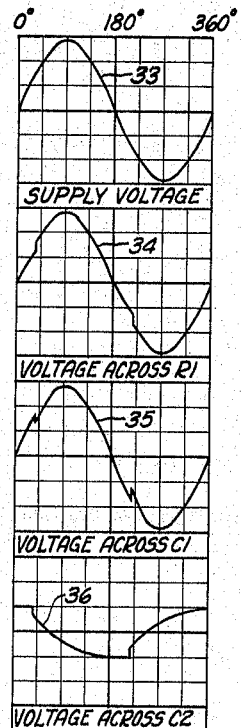
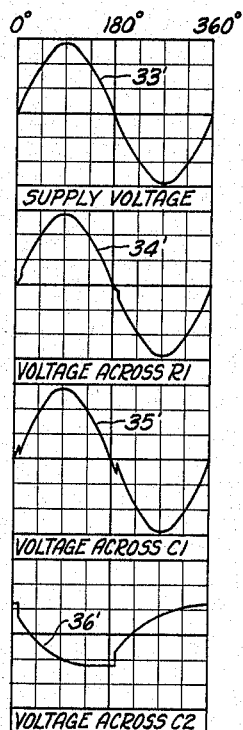
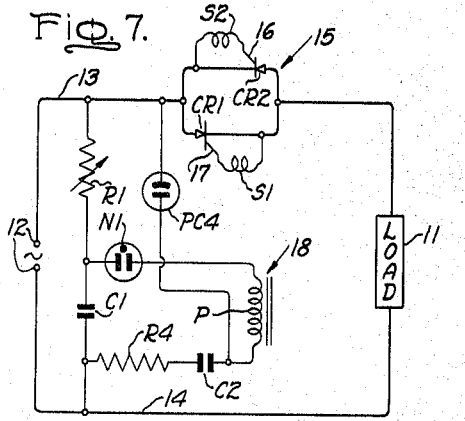
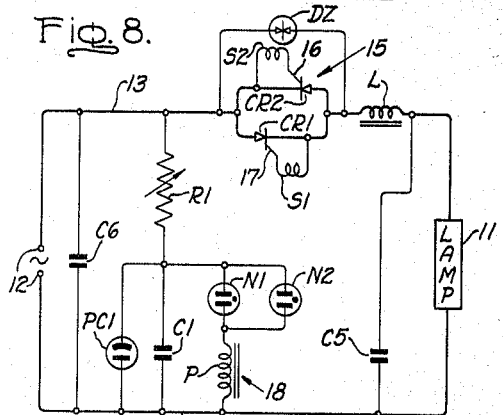
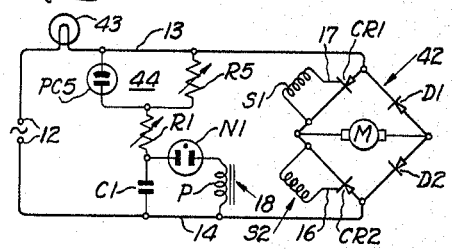
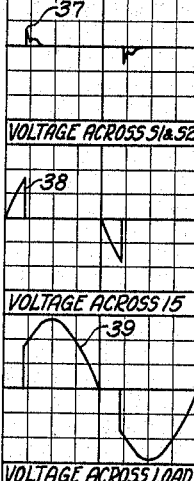
Inventor:
Joe A. Nuckolls
by Henry T. Olsen
His Attorney United States Patent Office 3,249,807
Patented May 3, 1966

3,249,807
CONTROL CIRCUIT USING PARALLEL
CONTROL RECTIFIERS
Joe A. Nuckolls, Hendersonville, N.C., assignor to General Electric Company, a corporation of New York
Filed Sept. 13, 1962, Ser. No. 223,480
14 Claims. (Cl. 315—199)

This invention relates to an improved semiconductor controlled rectifier switching circuit for controlling the energy to a load device such as a motor, heater, electric lamp, or the like, and has for its purpose the provision of a control circuit which is more versatile than those previously developed.

It is an object of this invention to provide an alternating current phase controlled switching circuit with a pulse generating circuit for operating a controlled rectifier circuit which will operate directly off the alternating current input and eliminate the need for a direct current operated control circuit. It is a further object of this invention to provide such a controlled rectifier switching circuit which utilizes economical, readily available components.

Another object of this invention is to provide an alternating current controlled rectifier switching circuit which provides switching of the controlled rectifier substantially throughout the full 360° current cycle. It is a further object of the invention to provide a control circuit which is easily adaptable to receive both positive and negative feedback signals for regulating the power or voltage or current in the load.

In the discharge lamp field, the use of a current limiting impedance in series with the discharge lamp to prevent an excess of current from being delivered to the lamp is well known. It is an object of this invention to provide a controlled rectifier switching circuit for operating such a lamp which makes possible a reduction in the size of the current limiting impedance necessary for proper operation of discharge lamps.

In the field of photoelectric control devices, it has been necessary to use dynamic contacts which inherently have a relatively short life and require replacement. It is an object of this invention to provide a photoelectric control which utilizes a controlled rectifier static switching circuit and eliminates the need for electromagnetic relay contacts. It is a further object of this invention to provide a controlled rectifier switching circuit which will provide both lamp ballasting for discharge lamps and photoelectric control, combined in a small, compact unit. A still further object of this invention is to provide a controlled rectifier circuit for starting and operating discharge lamps which will operate off a lower voltage source than hithero generally required.

In accordance with the above-mentioned objects, briefly, there is provided a circuit for controlling the energy to a load from a source of alternating current comprising controlled rectifier means connected in series with the load across the source of alternating current, said controlled rectifier means blocking current flow through the load until a signal pulse is applied to control electrode means thereof rendering said controlled rectifier means conductive. Control circuit means connected to the source terminals is provided for generating and applying a control signal to the control electrode means which places the controlled rectifier means in a conductive mode. The control circuit includes an electron control device which becomes conductive upon the application of a predetermined voltage and a resistance-capacitance circuit which determines the time in each alternating current cycle at which the electron control device becomes conductive. Hence, the time or phase angle at which the control signal is applied to the control electrode means to render the controlled rectifier means conductive is determined by the resistance-capacitance circuit.

In accordance with the further objects of the invention, there is provided a circuit for starting and operating a discharge lamp from a source of alternating current comprising a current limiting impedance and controlled rectifier means connected in series with the lamp. A signal generating means for operating the controlled rectifier includes a capacitor and a resistance connected in series and an electron control means is connected in series with the resistance and in parallel to the capacitor. The electron control means becomes conductive upon the application of a predetermined voltage level and triggers the control electrode of the controlled rectifier means. The signal generating means is connected directly to the A.C. current supply and the circuit is such that the resistance serves to control the time and rate of charge of the capacitor and hence, the time at which the electron control means, and thus, the controlled rectifier means, is rendered conductive.

The subject matter of the invention is particularly pointed out and distinctly claimed in the concluding portion of this specification. However, further objects and advantages of the invention, and the construction and operation of the control circuit, will become apparent from the following description taken in connection with the accompanying drawing in which:

FIG. 1 is a circuit diagram of an embodiment of the invention for controlling the power to any load device;

FIGS. 2a and 2b are series of wave forms showing the operation of the circuit of FIG. 1;

FIGS. 3 and 4 are circuit diagrams of modified forms of the signal generating circuits shown in FIG. 1;

FIGS. 5 and 7 are circuit diagrams of other embodiments of the invention, providing full phase angle control;

FIGS. 6a and 6b are series of wave forms showing the operation of the circuit of FIG. 5;

FIGS. 7a and 8 are circuit diagrams of discharge lamp starting and operating circuits with photoelectric control thereof; and FIG. 9 is a circuit diagram of an A.C. to D.C. control system.

In FIG. 1 there is shown a phase controlled switching circuit for controlling the current and voltage applied to a load 11 connected to terminals 12 of a source of alternating current by conductors 13 and 14. Controlled rectifier means 15 is provided in series with the load and includes a paralleled pair of oppositely poled controlled rectifiers CR1 and CR2. Each of the controlled rectifiers, CR1 and CR2, will block current flow in a reverse direction similar to an ordinary rectifier and will also block a current in the forward direction until a signal impulse is applied to its control, or gate, electrode. In the art, this application of a signal impulse to the control electrode of the controlled rectifier to render it conductive is sometimes referred to as a "gating," triggering, or "firing" action. When the anode of the controlled rectifier is positive with respect to its cathode, a signal impulse renders it conductive in the forward direction similar to an ordinary rectifier and will continue conduction without other signals until the cathode becomes positive with respect to the anode. A control, or gate, signal applied when the cathode of the controlled rectifier is positive with respect to the anode is ineffective since it will not conduct in this reverse biased condition. With paralleled oppositely polarized controlled rectifiers, on each half cycle of the alternating current input, one of the controlled rectifiers will have a positive anode and the other a positive cathode. Therefore, a control signal applied to control electrodes 16 and 17 will place only one of the controlled rectifiers in a conduction mode on each half cycle. A delay in the point in the alternating current input cycle at which the control signal impulse is applied to render the rectifier conductive, is known as phase control.

The control electrodes 16 and 17 are connected to secondary windings S1 and S2 of a coupling transformer 18 by conductors 19, 20, 21 and 22. A signal pulse generating circuit for controlling the controlled rectifier circuit includes primary P of coupling transformer 18, the transformer serving to isolate the controlled rectifier circuit from the impulse signal generating circuit. The transformer 18 is a pulse transformer which responds only to high frequency impulses and therefore only a single high frequency pulse can be applied to the controlled rectifier circuit. This protects the control electrode from any follow-through current from the alternating current supply 12 appearing in the signal generating circuit which could cause overheating and early failure of the controlled rectifier circuit.

The signal generating circuit comprises a variable resistance R1 in series with a charging capacitor C1 connected to conductors 13 and 14 directly across input terminals 12, thereby synchronizing the signal generating function with the source voltage. A discharge loop for discharging capacitor C1 includes transformer primary P and an electron control device, or bilaterally conducting diode N1, which becomes conductive only upon the application of a predetermined voltage thereto, the electron control device being connected to the source in parallel to the capacitor but effectively connected in series discharge relation thereto, the discharge loop being completed by a conductor 23. The discharge loop is over damped to prevent oscillation which could cause random high frequency pulses and cause random firing of the controlled rectifiers.

As shown in FIG. 1 the control device N1 is a glow lamp which is a discharge lamp having two electrodes in an envelope filled with neon gas which breaks down to form a conductive path when the potential between its electrodes rises to a predetermined voltage level. Once conductive, the glow lamp will remain in this condition until the voltage falls to some lower level. For example, a glow lamp which becomes conductive upon the application of about 83 volts remains conductive until the voltage falls to about 60 volts. Another characteristic making the glow lamp very advantageous is the non-polarity of the device enabling both electrodes to be the anode on the alternate half cycles. The control device N1 may also be a Shockley diode, but this would require placing two such devices in parallel and the difficulty of matching the two devices would arise, or a single five layer voltage device could be used to effect A.C. operation. Also, for reasons of economy, the glow lamp is preferred.

The operation of the circuit shown in FIG. 1 will be better understood by reference to FIGS. 2a and 2b wherein the wave forms across various of the components shown in the control circuit are depicted. In the FIG. 2a group of wave forms the wave form 24 is the voltage of input 12, wave forms 25, 26 and 27 are voltages across the resistance R1, capacitor C1 and transformer secondaries S1 and S2 of the control circuit, respectively. The wave forms 28 and 29 of the operating circuit are the voltages across the controlled rectifier circuit 15 and the load 11, respectively. The FIG. 2b group of wave forms 24' through 29' are taken across the same components with the resistance R1 increased in value.

On each half cycle, as the sine wave voltage 24 from the source 12 rises, the voltage 26 (FIG. 2a) across the capacitor C1, rises therewith in a substantially linear relation determined by the value of resistance R1. If resistance R1 is small, the slope of 26 is steep and the time delay, firing angle, or phase angle shift between the input voltage and voltage appearing on the control device N1 will be very small. Hence, the firing of one of the controlled rectifiers CR1 or CR2 is basically determined by the predetermined breakdown characteristics of the control device N1. If the resistance R1 is increased, slope of the wave 26' (FIG. 2b) is decreased so that there is a delay or phase shift in the time taken during the half cycle for the charging capacitor to reach the voltage necessary to break down the neon grow lamp N1. Therefore, the controlled rectifier will be gated at a later time in the half cycle delivering less power to the load 11. Resistance R1 can be increased to a point where the voltage appearing at capacitor C1 does not rise to the predetermined level necessary for conduction in control device N1 and, therefore, the load is turned off.

When the control device N1 becomes conductive, capacitor C1 partially discharges and a signal pulse is applied through the transformer primary P which induces a voltage pulse, at the time in the half cycle and of a duration shown at 30 in FIG. 2a, applied to transformer secondaries S1 and S2. The controlled rectifier CR1 or CR2 which has an anode positive with respect to its cathode will then be triggered into conduction by the pulse current applied to control electrodes 16 and 17 and the voltage 28 which has built up across the rectifier falls substantially to zero as indicated at 31 in FIG. 2a. The controlled rectifier CR1 or CR2 then permits current to flow, building up the voltage 29 (and consequently the power) applied to the load, until the source voltage again falls to zero at half cycle. The buildup and decline of voltage and power across the load is shown by curve 29 in FIG. 2a. In the showing of FIGS. 2a and 2b, the load 11 is assumed to be resistive. On the next half cycle as the anode voltage becomes negative that controlled rectifier CR1 or CR2 which was conductive becomes nonconductive and no power is transferred to the load until the signal generating circuit fires the other controlled rectifier.

The effect of increasing the resistance of R1 to decrease the power input to the load is further illustrated by curves 27', 28' and 29' in FIG. 2b. As the voltage pulse 27' appears at a later time in the half cycle, the point 31' at which the rectifier is gated, with the voltage across it falling to substantially zero, is correspondingly delayed. Accordingly, the portion of the half cycle supply voltage applied to the load will be reduced, as shown by curve 29', and the ultimate power delivered reduced accordingly.

On the next half cycle of operation, the operation is the same except that the charge on the capacitor C1 is opposite in polarity and the other controlled rectifier will have a positive anode bias with respect to its cathode. It will thus be seen that there is provided an alternating current phase controlled switching circuit which controls the current and voltage to the load 11, which eliminates the need for contact type switches entirely and which, by a simple adjustment of a variable resistor, will fully adjust the power delivered to the load. With two rectifiers, such control is achieved through both cycles of the alternating current.

In some circumstances, it may be necessary to protect the silicon controlled rectifier means 15 from transient voltage surges. In these cases, a readily available means for protecting the circuit is to connect a Thyrector DZ (FIG. 8) which is a semiconductor device having a double Zener characteristic in parallel to the controlled rectifier means. The Zener level of the Thyrector is above the voltage level normally applied across the controlled rectifier means and transients having voltage peaks higher than this exceed the Zener level and the excess voltage is clamped or limited thereby.

FIG. 3 shows a modified signal generating circuit for the controlled rectifier switching arrangement which provides photoelectric control for turning a lamp on at dusk and turning the lamp off at sunrise. It also provides constant light level output. As will be noted, the signal generating circuit is provided with a photoconductor PC1 and a second photoconductor PC2, both being connected in parallel with each other and with the capacitor C1.

The photoconductors may be a cadmium sulfide photocell which increases resistance in response to a decrease in light applied thereto. In use, photoconductor PC1 may be oriented so as to be responsive to changes in ambient light level and would increase its resistance as the light level was reduced at dusk sufficiently to cause the charge on capacitor C1 to rise to the predetermined voltage hold of control device N1. Photoconductor PC2 would be arranged so as to be shielded from ambient light and responsive only to the light output of the lamp. After the lamp started, the light directed on photoconductor PC2 would tend to delay charging of capacitor C1 and therefore maintain a constant light output. A resistance R3 is connected in series with photoconductor PC2 to prevent the lighting of the lamp from shutting the lamp off. Alternatively, photoconductor PC2 may have characteristics different from the characteristics of photoconductor PC1 in that PC2 may be responsive to differing wavelengths of light or heat.

In FIG. 4 a signal generating circuit similar to that of FIG. 3 is shown. In this modification, a capacitor C3 is connected in series with photoconductor PC2. This modification has the advantage that the amount of current shunted by a decrease in the resistance of photoconductor PC2 places a charge on capacitor C3, which still further delays the rate of voltage rise on capacitor C1 and correspondingly delays the firing of control device N1, but which retains this charge such that when the control device N1 becomes conductive the capacitor C3 is discharged, as well as capacitor C1. The effect is to stabilize the power delivered to the control device N1 and hence to the controlled rectifier gate circuit 15.

FIG. 5 shows a further modification of the photoelectric control circuit which enables the controlled rectifier switching arrangement to be turned on at the zero degree phase angle corresponding to the start of a half cycle of the alternating current supply. As in FIG. 1, the controlled rectifier means 15 is connected in series with a load 11. The signal generating circuit includes the rseistance R1 and capacitance C1 connected in series directly across the source of alternating current and with the control device N1 and coupling transformer primary P being connected in parallel to the capacitance forming a discharge loop for capacitor C1. A second charging capacitor C2 and current limiting resistor R4 are connected in series with primary P in the discharge loop circuit.

The operation of the circuit shown in FIG. 5 is illustrated in FIGS. 6a and 6b wherein the voltage wave forms across identified circuit components are depicted. In the FIG. 6a series of wave forms, the voltage across the source, across resistance R1, capacitor C1, capacitance C2, transformer secondaries S1 and S2, controlled rectifier means 15', and load 11 are indicated by numerals 33–39, respectively. Numerals 33'–39' indicate the voltage wave forms of FIG. 6b across the same components with resistance R1 decreased. The addition of capacitor C2 gives a broader range of control in the following manner.

When control device N1 becomes conductive by build-up of voltage charge on capacitor C1, as shown at 35 in FIG. 6a, the trigger pulse is discharged through the transformer primary P inducing voltage pulses in secondaries S1 and S2 as shown at 37 and a charge is placed on capacitor C2. The charge on capacitor C2 is trapped by the deionization and consequent non-conduction of N1 so that on each half cycle this residual charge shown at 36 in FIG. 6a is additive to the voltage appearing across C1 applied to N1. This means that N1 breaks down and conducts sooner during the half cycle of applied current, in effect advancing the phase angle at which the control device N1, and hence the controlled rectifier circuit, is triggered as shown at 38. By adjustment of R1 this control circuit provides for firing of the controlled rectifier means 15 at any portion of the cycle from full "on" to full "off" at either approximately 0° or 180°, or in between, the voltage across the load upon conduction of the rectifier circuit is shown at 39 in FIG. 6a.

The wave forms as depicted in FIG. 6b show the changes with respect to FIG. 6a effected by decreasing the net resistance of R1. Thus, because of the greater residual charge on capacitor C2 as shown at 36' and the faster rate of charge on C1, the discharge of the capacitor C1 as shown at 35' occurs earlier in the cycle. This advances the signal pulse through transformer secondaries S1 and S2, shown at 37' and the triggering of the controlled rectifier circuit 15 (shown at 38'). Thus, the voltage across the load (39') is almost a complete sine wave delivering substantially the full power available from the source to the load.

The addition of capacitor C2 as shown in FIG. 5 to the signal generating circuit permits a photoelectric control circuit in which a photoconductor PC3 is placed in parallel with resistance R1. In this position, when light falls on photoconductor PC3, decreasing its resistance, the effect is to by-pass resistance R1, decreasing the net resistance of the control circuit. This increases the voltage of the net residual charge applied to capacitor C2. The result is to advance the firing angle of the controlled rectifier circuit rather than delaying it, as in the signal generating circuit of FIG. 3. This permits turn off of the load at the zero degree phase angle of the supply current rather than at approximately 180°.

When an initial application of current to the control circuit of FIG. 5 occurs when light is applied to the photoconductor PC3 as, for example, during daylight conditions, then the resistance of photoconductor PC3 will be low. The voltage appearing on capacitor C2 after the initial breakdown of control device N1 thereafter in each succeeding half cycle exceeds the predetermined breakdown voltage of the control device and, by discharge therethrough, reverses current flow therethrough prior to, or simultaneously with, the reversal in source current. Since the predetermined controlled rectifier CR1 or CR2 to be triggered is not at this time properly biased by the source, i.e., its cathode is positive with respect to its anode, the discharge does not render the controlled rectifier conductive. Once the control device N1 and the pulse transformer are conducting no further high frequency pulse can be generated during that half cycle to trigger the controlled rectifier circuit. Therefore, the controlled rectifier circuit remains non-conductive and the load is off.

As the light applied to the photoconductor PC3 decreases, as, for example, with nightfall, the resistance of the photoconductor increases and the voltage or residual charge appearing across capacitor C2 decreases. As long as the voltage of the residual charge on capacitor C2 exceeds the breakdown voltage of control device N1, the trigger pulse to controlled rectifier CR1, for example, occurs at a time when CR1 is not forward biased for conduction. In other words, the trigger pulse has been so far advanced that it occurs prior to zero phase in the trailing edge of the preceding half cycle. Where this voltage across capacitor C2 falls below the predetermined breakdown characteristic of control device N1, then the trigger pulse is delayed and occurs during the instant half cycle when controlled rectifier C1 is forward biased. Therefore, the control device N1 becomes conductive at a time at which the appropriate controlled rectifier CR1 or CR2 is properly biased and hence susceptible of being triggered into conduction which energizes the load.

As shown in FIG. 7, a feedback modification including the capacitor C2 in the discharge loop circuit is shown, which provides for constant light level control of, for instance, a discharge lamp circuit or similar load whereby a change in light will indicate load condition. A photoconductor PC4, which may be responsive to the operation of a lamp, discharges, i.e., dissipates the charge on, capacitor C2 responsive to the resistance therein. Thus, as the photoconductor increases in resistance in response to a decrease in light, the discharging rate of C2 through the photoconductor PC4 is lowered and the firing angle is advanced delivering more power to the load. As the resistance of the photoconductor decreases in response to an increase in the light from the lamp less power will be delivered to the load since the firing angle of the controlled rectifier circuit is delayed. Thus, the power to the load is maintained constant and a constant light output may be achieved.

A further modification of the circuit may be utilized to isolate the regulation function and the turn "on-off" functions shown in FIGS. 3 and 4 by the use of a combination of the photoconductive controls shown in FIGS. 5 and 7. This circuit arrangement is shown by FIG. 7a. In it the photoconductor PC3 is placed in parallel with the resistor R1 and the photoconductor PC1 is connected in parallel with capacitor C1; otherwise, the arrangement of parts and the electrical circuit diagram is the same as that illustrated by FIG. 7 and the parts have been numbered correspondingly.

The arrangement shown by FIG. 7a has the advantages that the photoconductors PC1 and PC3 are isolated from each other in the electrical control circuit and, in fact, may be used to obtain opposite effects in terms of light output or other characteristics of load 11. For example, if light falls on photoconductor PC1 to decrease its resistance the effect is to delay the firing angle of the control device N1 and associated circuitry; on the other hand, if light falls on the photoconductor PC3 to reduce its resistance, the effect is just the opposite in that the firing angle is advanced. Manifestly, the amount of light falling on the photoconductors PC1 and PC3 can be controlled independently of each other and thus an independent control is attained for delaying or advancing the firing angle of the entire control circuit at will depending upon the uses to which the phase control switching circuit will be put.

One application of the A.C. phase control switching circuit of FIG. 7a is in controlling the operation of a conventional high pressure mercury discharge lamp currently in widespread use for illumination purposes. Photoconductor PC1 responds to ambient light levels. As darkness approaches, the resistance of photoconductor PC1 increases thereby increasing the rate of charge applied to capacitor C1 and control device N1 so that at any selected point the firing angle is advanced to operate the control circuit and initiate operation of the control rectifiers CR1 and CR2 to start operation of the lamp. Photoconductors PC3 and PC4 may be oriented so as to be shielded from ambient light levels and responsive only to the light output of the lamp. With the lamp turned off the resistances of photoconductors PC3 and PC4 wil be high. Initially, the lamp arc voltage will be low and the power drawn by the lamp correspondingly low and, since the mercury is not yet fully vaporized, the light output of the lamp will be very low. Accordingly, the light falling on PC3 will be low, its resistance high, and the net resistance of the circuit through R1 will remain substantially unchanged with little effect on the firing angle of CR1 and CR2. However, as the light output of the lamp increases on warm-up the resistance of photoconductor PC3 will decrease, shunting more current around the resistance R1 and advancing the firing angle of the silicon controlled rectifier circuit 15. This operation is necessary since the discharge lamp impedance increases as the degree of vaporization therein increases. Therefore, it is necessary to increase the amount of power applied to the lamp electrodes to bring the lamp up to full light output. The photoconductor PC4, which may have a slightly different characteristic than photoconductor PC3, serves to control the amount of charge on the capacitor C2. The increased light output of the lamp has the same resistance change effect on photoconductor PC4 as PC3; that is, the resistance decreases with the increase in light falling thereon. But the effect on the control circuit is to delay the firing angle since the amount of charge on capacitor C2 will be decreased as the resistance of photoconductor PC4 decreases as disclosed above, with reference to FIG. 7. The effect thus is to place an upper limit on the amount of power which can be applied to the lamp and in conjunction with photoconductor PC3 will regulate the power to the lamp to yield a constant light level output.

Another control circuit for a discharge lamp circuit is shown in FIG. 8 wherein like parts have the same number, lamp 11 being a commercial fluorescent or mercury discharge lamp connected in series with the controlled rectifier circuit 15 and a current limiting inductance L. The circuit permits reduction in the physical size and electrical impedance of the inductance with a consequent reduction in cost, because the portion of the duty-time on the impedance L is performed by the controlled rectifier circuit 15. To provide a maximum load impedance for the controlled rectifier circuit, a capacitor C5 is connected across the lamp which also provides a high starting voltage and maximum stability in lamp operation. Alternatively, a resistance can be used in those instances in which a high voltage is not required. Power factor improvement is provided in the circuit by the capacitor C6 connected across the source terminals. The reliability of the circuit is enhanced by the addition of a second control device N2 connected in parallel with the control device N1. Should control device N1 become inoperative or shift in voltage responsiveness, the operation of control device N2 takes over and no replacement of the defective control device N1 is necessary, thus rendering a circuit which may, for example, be encapsulated. The circuit insofar as described could be utilized as a lamp dimming circuit for incandescent as well as discharge lamps merely by varying the resistance R1.

A distinct advantage of the controlled rectifier means in series with a discharge lamp lies in its ability to produce a steep wavefront, high open circuit voltage which is desirable to start the lamp. In the ordinary case of a discharge lamp starting circuit, the voltage appearing at the lamp electrodes does not exceed 2 times the R.M.S. voltage of the line. However, with the controlled rectifier circuit, the rectifiers decouple the lamp from the source and the voltage appearing at lamp electrodes is only limited by the resonant condition of the inductive and capacitive components and the Thyrector or double Zener clamping or voltage limiting action; therefore, if the loading resitsance of the lamp is high, as it is when the lamp is unlit, the resonant circuit provides a voltage which is some five times the voltage of the source. Thus, on a 120 volt A.C. line the controlled rectifier circuit allows a voltage appearing at lamp electrodes of some 500 volts for starting the lamp. The inherent ability of the controlled rectifier circuit to produce high voltage as a function of lamp loading enhances the stability of lamp operation. The circuit becomes a photoelectric control circuit by the addition of a photoconductive device PC1 connected in shunt to the capacitor C1. Photoconductor PC1 has a characteristic of increasing resistance with a decrease in light appearing thereon and may be a cadmium sulfide photocell. When the light level applied thereto is high, the resistance is low, and the current through R1 is shunted around capacitor C1. The voltage rise on C1 is then insufficient to render control device N1 or N2 conductive to trigger the controlled rectifier circuit 15. Therefore, the lamp 41 is off.

When, for example, ambient light levels are applied to photoconductor PC1, the lamp 11 would be off during the daylight hours and as the light level was reduced at dusk the resistance of PC1 increases and the electron control device N1 or N2 becomes conductive, triggering the controlled rectifier circuit 15 and turning on the lamp.

The photocell may also be directed at the lamp so as to be responsive thereto. By masking selected portions of the photocell a dual control function may be achieved. The resistance of that portion of the photocell responsive to light output may be balanced with respect to the resistance R1 so that if the light from the lamp increases above a certain level, the triggering of the controlled rectifier circuit would be delayed, delivering less power to the lamp and lowering its light level. This particular application makes a constant light level control circuit.

An alternating current to direct current control system is shown in FIG. 9 wherein an electric motor M is connected in the direct current leg of a bridge circuit 42 comprising paralleled controlled rectifiers CR1 and CR2 and paralleled diodes D1 and D2 in series with the controlled rectifiers CR1 and CR2, respectively. A current responsive means 43 is connected in series with the load circuit and may be, for example, a low wattage incandescent filament lamp which will increase light output as the current drawn by the motor M increases.

The resistance R1 and capacitance C1 of the signal generating circuit are connected to the source through a voltage dividing network 44, the voltage dividing network 44 including parallel resistance devices PC5 and R5. The device PC5 may be a cadmium sulfide photoelectric control cell which decreases in resistance with an increase in light applied thereto. The resistance R5 may be a variable resistor and the varying of the resistance thereof nominally controls the speed at which the motor operates. As the motor draws more current as when under increased load, the light output of the current responsive means 43 will increase thereby decreasing the resistance of photoconductive means PC5. This lowers the voltage across R1 and advances the firing of control device N1, delivering more power to the motor.

In place of the various photoelectric control feedbacks above disclosed, it should be noted that thermistors responsive to temperature changes either in ambient surroundings or in conditions of the load and humidity controls may be used to control the phase angle switching of the signal generating circuit. In all of the modifications above described, except where a particular load is specified, it has been assumed that the load is resistive. However, for highly capacitive or inductive loads, a feedback connection between the load voltage and the signal generating circuit may be desirable to prevent the inductive or capacitive load from placing the controlled rectifier voltage out of phase with the line voltage appearing in the signal generating circuit. For example, to overcome this condition, the trigger circuit including feedback can be placed directly across the controlled rectifier means 15 and thereby synchronize the trigger pulse with the operation of the load.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is desired to be secured by Letters Patent of the United States is:

1. A circuit for controlling energization of a load from an alternating current supply comprising, in combination, bidirectional conducting controlled rectifier means electrically connected between the load and the alternating current supply, said controlled rectifier means being normally nonconductive to block current flow to the load and having an electrode control means to render it conductive in either direction depending on the polarity of the alternating current supply; and means for applying a control signal to said electrode control means, said means including a resistance and capacitance electrically connected together in series and directly to the alternating current supply, and a control device which becomes conductive upon the application of a predetermined voltage electrically connected in series with said resistance and in parallel with said capacitance so that the resistance-capacitance circuit determines a time in each alternating current cycle at which the control signal is generated.

2. A circuit for controlling energization of a load from an alternating current supply comprising, in combination, bidirectional conducting controlled rectifier means electrically connected between the load and the alternating current supply, said controlled rectifier means being nonconductive to block current flow to the load and having an electrode control means to render it conductive in either direction depending on the polarity of the alternating current supply; and means for applying a control signal to said electrode control means to render said controlled rectifier conductive, said means including a resistance and capacitance electrically connected together in series and to the current supply, a diode having a negative resistance characteristic and which becomes conductive upon the application of a predetermined voltage, and means electrically connecting said diode in series with said resistance and in parallel with said capacitance and to said electrode control means so that the resistance-capacitance circuit determines a time in each alternating current cycle at which the diode becomes conductive and a control signal is applied to the electrode control means.

3. A circuit for controlling energization of a load from an alternating current supply comprising in combination a pair of controlled rectifiers connected between the load and the alternating current supply, said controlled rectifiers being connected in parallel but poled for current flow in opposite directions when conducting, and each having a control electrode; and means for applying signals to said control electrodes to render the controlled rectifiers conductive, said means comprising a resistance and a capacitance connected in series across said alternating current supply and a bilaterally conducting diode in series with transformer means connected across said capacitance, said diode having a breakdown voltage which is correlated to said resistance and capacitance to determine the time in each alternating current half cycle when the diode becomes conducting, and connections from said transformer means to said control electrodes in order to fire said controlled rectifiers each time said diode becomes conducting.

4. A circuit for controlling the current and voltage to a load energized by a source of alternating current comprising, in combination, controlled rectifier means connected in series with the load across the source of alternating current, said controlled rectifier means blocking current flow through the load until a signal pulse is applied to its control electrode means rendering said controlled rectifier means conductive; and a signal generating circuit connected to said control electrode means including a resistance and a first capacitor connected in series to the alternating current source forming a charging circuit for said capacitor, and a discharge loop including said first capacitor, an electron control device which becomes conductive upon the application of a predetermined voltage, an inductance and a second capacitor whereby when the charge on the first capacitor reaches said predetermined voltage the electron control device conducts discharging the first capacitor through the inductance and charging the second capacitor connected in series therewith, the charge on said second capacitor serving to reduce the voltage from the source necessary to render the electron control device conductive.

5. A circuit for controlling the current and voltage to a load energized by a source of alternating current comprising, in combination, controlled rectifier means connected in series with the load across the source of alternating current, said controlled rectifier means including paralleled oppositely poled silicon controlled rectifiers, each having a control electrode; and means for applying a control signal to said control electrodes including a coupling transformer having secondary windings connected to the control electrodes, a resistance and capacitance connected in series to the source terminals and a glow lamp connected in series with the resistance and in parallel to the capacitance whereby when the charge on the capacitance reaches a certain level the glow lamp conducts, and the primary of said coupling transformer being connected in series with the glow lamp so that the charge from the capacitance is delivered through the primary when the glow lamp becomes conductive.

6. A photoelectric control circuit for controlling the current and voltage to a load energized by a source of alternating current in response to changes in light levels comprising, in combination, controlled rectifier means having control electrode means and connected in series with the load across the source of alternating current, the controlled rectifier means blocking current flow through the load until a signal pulse is applied to its control electrode means rendering said controlled rectifier means conductive; and means connected to said control electrode means for applying a control signal to the control electrode means including a resistance and capacitance connected in series to the alternating current source, a control device which becomes conductive upon the application of a predetermined voltage connected in series with the resistance and in parallel to the capacitance, and a photosensitive control device in shunt relation to the capacitance having increasing resistance as the light level decreases whereby the source is ineffective to render said control device conductive until the resistance of the photosensitive device rises to a predetermined level.

7. A circuit for starting and operating a discharge lamp from a source of alternating current in response to a light signal comprising, in combination, a current limiting impedance and controlled rectifier means having control electrode means connected in series with the lamp, means for generating a control signal for said control electrode means in response to a light signal including a capacitor and a resistance connected in series to the source terminals, the resistance serving to control the time rate of charge of the capacitor, a photosensitive device of variable resistance in response to light changes connected in shunt relation to the capacitor and electron control means connected in series with the resistance and in parallel to the capacitor which becomes conductive upon the application of a predetermined voltage level, and means connecting the output of the signal generating means to the control electrode means of the controlled rectifier means.

8. A circuit for controlling the current and voltage to a load energized by a source of alternating current in response to the operation of the load comprising, in combination, current sensitive means and silicon controlled rectifier means connected in series with the load across the source of alternating current, the controlled rectifier means blocking current flow through the load until a signal pulse is applied to its control electrode means rendering said controlled rectifier means conductive; and means for applying a control signal to the control electrode means in response to said current sensitive means including a resistance and capacitance connected in series to the source terminals, an electron control device which becomes conductive upon the application of a predetermined voltage connected in series with the resistance and in parallel to the capacitance and means connected to said capacitance and responsive to said current sensitive means for determining the rate of charge on said capacitance whereby the time in each current half cycle is regulated in response to the operation of the load.

9. A speed control system for an electric motor connected to a source of alternating current comprising silicon controlled rectifier means and means for producing a light signal, the intensity of which is proportional to the current flowing through the motor, connected in series with the motor across the source of alternating current, the controlled rectifier means blocking current flow through the motor until a signal pulse is applied to its control electrode means rendering said controlled rectifier means conductive; and means for applying a control signal to the control electrode means in response to said light signal including a resistance and capacitance connected in series to the source terminals, an electron control device which becomes conductive upon the application of a predetermined voltage connected in series with the resistance and in parallel to the capacitance, and light sensitive means having increasing resistance with a decrease in applied light connected to the capacitance whereby the time rate of charge of the capacitance is determined by the current flowing through the motor.

10. A photoelectric control circuit for starting and operating a discharge lamp from a source of alternating current in response to changes in ambient light levels comprising, in combination, a current limiting impedance and controlled rectifier means having control electrode means connected in series with the lamp; means for generating a control signal for said control electrode means in response to a decrease in ambient light conditions for starting said lamp including a resistance and first capacitance connected in series to the alternating current source, an electron control means connected in series with the resistance and in parallel to the capacitance which becomes conductive upon the application of a predetermined voltage level light sensitive means having a characteristic of increasing resistance as ambient light levels decrease connected in shunt relation to the capacitance for determining the time rate of charge thereof and a discharge loop circuit connecting the signal generating means to the control electrode means of the controlled rectifier means including, in series connection said capacitance, said electron control means, an inductance and a second capacitance, said second capacitance being charged through said inductance when the control signal is applied to the control electrode means and serving to reduce the time at which said electron control device becomes conductive.

11. A photoelectric control circuit for controlling the current and voltage to a lighting device energized by a source of alternating current in response to changes in ambient light level and light from the lighting device comprising, in combination, controlled rectifier means connected in series with the lighting device across the source of alternating current, the controlled rectifier means blocking current flow through the lighting device until a signal pulse is applied to its control electrode means rendering said controlled rectifier means conductive; and means for applying a control signal to the control electrode means including a resistance and a capacitance connected in series to the alternating current source, a control device which becomes conductive upon the application of a predetermined voltage connected in series with the resistance and in parallel to the capacitance, a first photosensitive control device responsive to ambient light level connected in shunt relation to the capacitance, and a second photosensitive control device responsive to light from the lighting device connected in shunt relation to the capacitance and to said first photosensitive control device, said first and second photosensitive control devices having increased resistance as the light level decreases whereby the alternating current source is ineffective to render said control device conductive until the resistance of said first photosensitive device rises to a predetermined level and the light from the lighting device is maintained at a constant level by change in resistance of said second photosensitive device.

12. A control circuit for controlling the current and voltage to a load energized by a source of alternating current in response to operating conditions of the load comprising, in combination, controlled rectifier means connected in series with the load across the source of alternating current, said controlled rectifier means blocking current flow through the load until a signal pulse is applied to its control electrode means rendering said controlled rectifier means conductive; a signal generating circuit connected to said control electrode means including a resistance and a first capacitor connected in series to the alternating current source forming a charging circuit for said first capacitor, a discharge loop, said discharge loop including, in series connection, said first capacitor, an electron control device which becomes conductive upon the application of a predetermined voltage, an inductance, and a second capacitor, so that when the charge on the first capacitor reaches said predetermined voltage the electron control device becomes conductive and discharges the first capacitor through the inductance and charges the second capacitor connected in series therewith, the residual charge on said second capacitor serving to reduce the voltage from the source necessary to render the electron control device conductive, and means responsive to operating conditions of the load including a first condition sensing means connected in shunt relation to said first capacitor, a second condition sensing means connected in shunt relation to said resistance, and a third condition sensing means connected in series relation to said second capacitor, all said condition sensing means having a varying resistance in response to varying conditions in the load.

13. A photoelectric control circuit for starting and operating a discharge lamp from a source of alternating current in response to changes in ambient light levels comprising, in combination, a current limiting impedance and controlled rectifier means having a control electrode connected in series with the lamp; means for generating a control signal for said control electrode in response to a decrease in ambient light conditions for starting said lamp including a resistance and first capacitance connected in series to the alternating current source, a bilaterally conducting diode connected in series with the resistance and in parallel to the capacitance which becomes conductive upon the application of a predetermined voltage level, light sensitive means having a characteristic of increasing resistance as ambient light levels decrease connected in shunt relation to the capacitance for determining the time rate of charge thereof and a discharge loop circuit connecting the signal generating means to the control electrode means of the control rectifier circuit including said capacitance and said bilaterally conducting diode, a primary of a pulse transformer and a second capacitance, said second capacitance being charged through said primary when the control signal is applied to the control electrode means and serving to reduce the time at which said bilaterally conducting diode becomes conductive.

14. A control circuit for controlling the current and voltage to a lighting device energized by a source of alternating current in response to operating conditions of the lighting device comprising, in combination, controlled rectifier means connected in series with the lighting device across the source of alternating current, said controlled rectifier means blocking current flow through the lighting device until a signal pulse is applied to its control electrode means rendering said controlled rectifier means conductive; a signal generating circuit connected to said control electrode means including a resistance and a first capacitor connected in series to the alternating current source forming a charging circuit for said first capacitor, a discharge loop, said discharge loop including, in series connection, said first capacitor, an electron control device which becomes conductive upon the application of a predetermined voltage, an inductance, and a second capacitor, so that when the charge on the first capacitor reaches said predetermined voltage the electron control device becomes conductive and discharges the first capacitor through the inductance and charges the second capacitor connected in series therewith, the residual charge on said second capacitor serving to reduce the voltage from the source necessary to render the electron control device conductive, and means responsive to operating conditions of the lighting device including a first photosensitive means connected in shunt relation to said first capacitor responsive to ambient light levels, a second photosensitive means connected in shunt relation to said resistance responsive to the lighting device, and a third photosensitive means connected in series relation to said second capacitor responsive to the lighting device, all said photosensitive means having an increasing resistance in response to decreasing light levels.

References Cited by the Examiner
UNITED STATES PATENTS

| | | | |
|---|---|---|---|
| 1,976,355 | 10/1934 | Mees et al. | 318—313 |
| 2,262,361 | 11/1941 | Gulliksen | 318—313 |
| 2,619,618 | 11/1952 | Adler | 315—238 |
| 2,773,234 | 12/1956 | Large | 323—24 |
| 2,954,509 | 9/1960 | Izenour | 315—199 |
| 2,973,456 | 2/1961 | Smyth | 315—159 |
| 3,005,946 | 10/1961 | Thompson | 323—24 |
| 3,159,755 | 12/1964 | Duncan | 307—88.5 |

GEORGE N. WESTBY, *Primary Examiner.*

LLOYD McCOLLUM, ROBERT SEGAL, *Examiners.*

D. E. SRAGOW, G. P. HAAS, JR., *Assistant Examiners.*